United States Patent [19]

Knowlton

[11] 4,350,658

[45] Sep. 21, 1982

[54] INTERIM PRESERVATION OF SURFACE COATING APPLICATORS

[76] Inventor: Floyd M. Knowlton, Forty Chirchill Ct., Fayetteville, N.Y. 13066

[21] Appl. No.: 274,242

[22] Filed: Jun. 16, 1981

[51] Int. Cl.[3] ...................... B01J 19/00; B65D 81/24; B65D 85/00

[52] U.S. Cl. .................................. 422/40; 206/213.1; 206/524.4

[58] Field of Search ...................... 422/40, 41, 42, 43; 206/213.1, 524.4

[56] References Cited

U.S. PATENT DOCUMENTS

| | | |
|---|---|---|
| 2,325,380 | 7/1943 | Edwards . |
| 2,449,818 | 9/1948 | Olsen . |
| 2,965,111 | 12/1960 | Feigelman . |
| 3,629,004 | 12/1971 | Cooper et al. . |
| 3,699,982 | 10/1972 | Pipkins . |
| 4,231,804 | 11/1980 | Petterson et al. . |
| 4,231,805 | 11/1980 | Petterson et al. . |

OTHER PUBLICATIONS

Abstract of Great Britain Patent 1,603,367; Brushes International Journal; vol. 68, No. 781; 1/82, p. 46 (Patent published 5-1978).

*Primary Examiner*—Barry S. Richman

*Attorney, Agent, or Firm*—Roylance, Abrams, Berdo & Farley

[57] ABSTRACT

A method and apparatus for the interim preservation of uncleaned surface coating applicators is disclosed. A coating applicator such as a paint brush which has a coating composition such as paint on its application surface is supported in an interior space of a container having a volatile, liquid preservation agent in the interior thereof. The liquid preservation agent is in gaseous contact with the interior space and the applicator supported in the interior space is out of liquid contact with the liquid preservation agent. The container is sealed and the uncleaned applicator is maintained in the container without hardening or drying of the coating composition until further use of the coating applicator. Apparatus embodiments for advantageous use of the method are disclosed.

12 Claims, 6 Drawing Figures

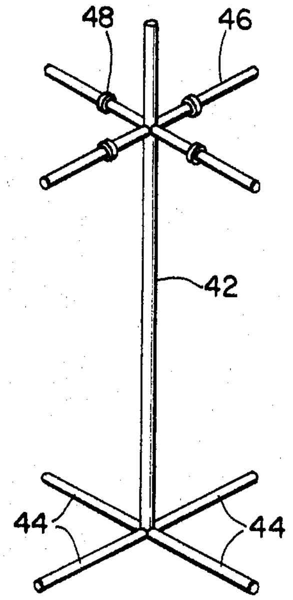
FIG. 3
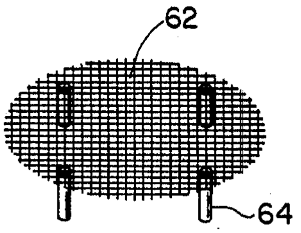
FIG. 4
FIG. 5
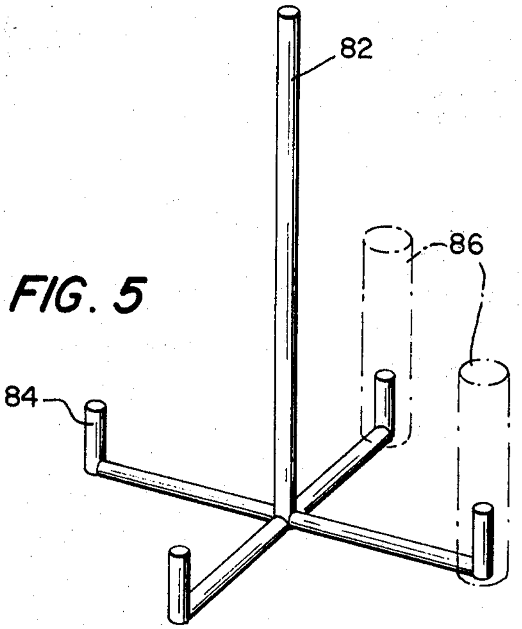

INTERIM PRESERVATION OF SURFACE COATING APPLICATORS

BACKGROUND OF THE INVENTION

1. Field of the Invention

The invention relates to the preservation of surface coating applicators. More specifically, the invention relates to the interim preservation of uncleaned paint brushes, pads, rollers and the like.

2. Description of the Prior Art

The application of paint, lacquers, enamels and the like to houses, walls, pictures, furniture, etc. typically involves interim periods of non-use of the painting implements. As is well known, paint brushes, rollers, pads and the like which have been used to apply paint must be thoroughly cleansed or otherwise treated during the period of non-use in order to avoid destruction of the painting implement due to drying of the paint. Washing of paint applicators is conducted using petroleum derivatives, turpentine, ketones and other organic solvents when the paint is oil-based or otherwise contains an organic solvent.

During short periods of non-use, paint brushes have been wrapped in metal foils or other wrapping materials to prevent drying of the paint. This procedure works effectively for some types of paint and so long as the interim period of non-use is relatively short. It is also a standard practice to leave paint brushes submerged in solvent during periods of non-use; however, the solvent becomes contaminated, cannot be used with implements holding paints of a different color or a different nature and, at any rate, must be discarded after a relatively short period of time.

It is thus well recognized that the interim preservation of painting implements during periods of non-use involves the destructive use of organic solvents, depleting natural resources and often resulting in pollution as when the organic solvents are poured down the drain or simply poured on the ground. Further, human exposure to volatile paint solvents involves a medical risk which increases with long term continued exposure to the solvents. The interim cleaning of paint applicators exposes humans to solvent fumes and should be eliminated, if possible.

With water-based paint, such as latexes, the interim preservation of painting utensils is typically accomplished by thoroughly cleaning the utensil with soap and warm water. Although not involving the depletion of natural resources and/or severe pollution problems, the preservation of water-based painting utensils during interim non-use is still cumbersome and time consuming, and there is a continuing need for improvement.

SUMMARY OF THE INVENTION

An inexpensive and non-destructive method for the interim preservation of surface coating applicators has now been found. A coating applicator having a substantial quantity of a dryable liquid surface coating composition, e.g., paint, on its application surface is supported in an interior space of a container having a volatile, liquid preservation agent also in the interior thereof. The liquid preservation agent is in gaseous contact with the interior space in which the coating applicator is supported. The applicator is supported out of contact with the liquid preservation agent. The container is thereupon sealed, and the uncleaned applicator is maintained in the container without hardening or drying of the coating composition until further use of the coating applicator. Preservation agents include mineral spirits, turpentine, methanol, ethanol, ketones and the like. Such organic solvent preservation agents can be used when the liquid coating composition on the applicator is an oil-based paint or other organic solvent-based coating composition. Preservation agents for use with water-based coating compositions, e.g., latex paints, can advantageously be an aqueous solution of ammonia or an amine.

Apparatus embodiments of the invention involve the combination of elements consisting of a reversibly sealable container having means in the interior thereof for retaining a body of volatile, liquid preservation agent in gaseous communication with an interior space in the container. Means are provided for supporting coating applicators in the interior space of the container and out of contact with the volatile, liquid preservation agent. The means for retaining the liquid preservation agent can further include means for heating the liquid.

The method and apparatus of the invention provide considerable improvement over the prior art. Thus, turpentine, paint thinners and the like can be used to preserve painting applicators without substantial contamination or destruction of organic solvents. Human exposure to volatile organic solvents is considerably lessened. The time involved in interim clean-up of coating applicators is virtually eliminated. Painting applicators wetted with different colors or types of paints can be stored in a single apparatus without cleaning and without intermixing of the different paints.

BRIEF DESCRIPTION OF THE DRAWINGS

In the drawings which form a part of the original disclosure of the invention;

FIG. 3 is a perspective view of a portion of an apparatus embodiment of the invention;

FIG. 4 is a perspective view of a portion of an apparatus embodiment of the invention; and FIG. 5 is a perspective view of a portion of an apparatus embodiment of the invention.

DETAILED DESCRIPTION OF THE INVENTION

The invention is useful in the preservation of applicators used to apply various dryable and typically hardenable surface coating compositions. Such compositions include oil-based paints; volatile, organic solvent-based paints, water-based latex paints, varnishes (such as polyurethanes), shellacs, latex adhesives, solvent-based adhesives and the like. Advantageously, the invention is used to preserve applicators used to apply paints wherein the term paint is used broadly to include varnishes, shellacs and the like.

Any of various applicators used to apply surface coatings can be preserved according to the invention. Thus, paint brushes, painting pads, rollers and the like which have been used to apply a liquid, dryable surface coating composition and which have the liquid coating composition on the surface of the applicator can be preserved according to the invention.

Figure 1:
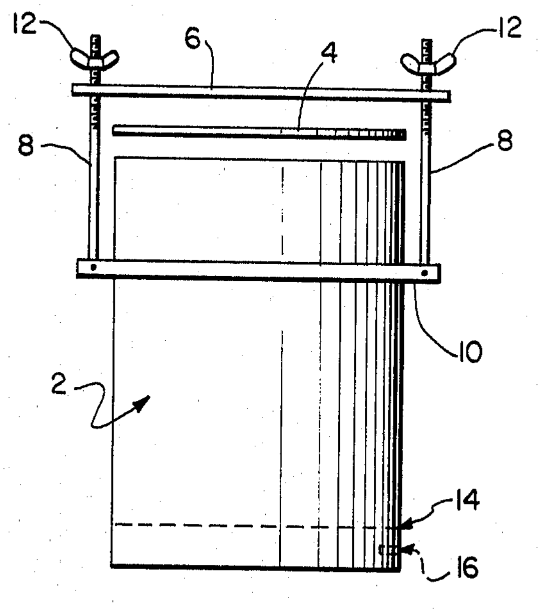
FIG. 1 is an outside elevational view illustrating a part of an apparatus embodiment of the invention.

The invention is conducted using a simple, resealable container such as is illustrated in FIG. 1. Cylindrical container 2 is provided together with gasket 4 which cooperates with lid 6 to seal the container. Container 2 is advantageously constructed of glass, metal or a polymer not subject to solvent attack. The lid is secured by means of threaded rods 8 supported by lower support 10 which is fixedly attached to main container body 2. Wing nuts 12 can be tightened on rods 8 for securing lid 6 and gasket 4 onto the open top of container 2, thereby reversibly sealing the container.

In the interior of the container is a volatile, liquid preservation agent. In the embodiment of FIG. 1, the preservation agent is provided in the bottom of the container below the height indicated generally by dotted line 14. Above the liquid level shown in FIG. 1, there is an open space in gaseous communication with the volatile liquid.

Figure 2:
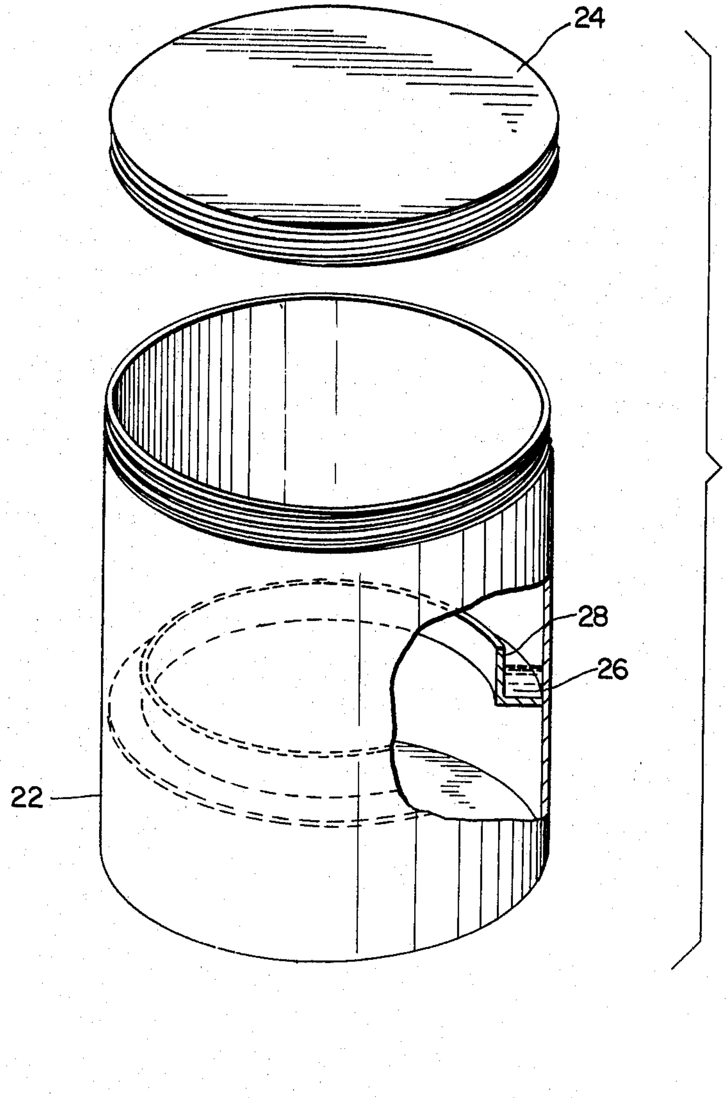
FIG. 2 is a perspective view with parts shown in cut-away of another portion of an apparatus embodiment of the invention.

FIG. 2 illustrates another embodiment of the invention wherein cylindrical container 22, which is reversibly sealable by threaded lid 24, retains the volatile liquid by means of a concentric trough 26 within the container. Trough 26 is formed by internal wall or lip 28 and the wall of container 22. In the embodiment shown in FIG. 2, the remainder of the interior of container 22 constitutes an open space in which painting applicators are to be supported with or without an additional support such as illustrated in FIGS. 3, 4 and 5. The provision of the preservation agent in trough 26 avoids contamination of the liquid preservation agent due to paint or the like dripping from stored applicators.

Advantageous supports for supporting paint or surface coating applicators are illustrated in FIGS. 3, 4 and 5. In FIG. 3 is shown a rack comprising vertical support 42 which is maintained in an upright position by perpendicular horizontal supports 44 comprising the base of the rack. Near the top of vertical support 42 are four horizontal supports 46. Paint brushes and the like can be supported vertically on supports 46 through holes drilled through the handles of the paint brushes. Stops 48 maintain paint brushes away from vertical post 42 and also away from each other. The rack shown in FIG. 3 may simply be placed in the interior of the containers of FIGS. 1 or 2 for supporting paint brushes in the interior of the containers.

FIG. 4 illustrates a wire rack for use with a container wherein the volatile liquid is to be retained at the bottom of the container, such as shown in FIG. 1. Rack 62, which is advantageously constructed of a wire mesh, includes feet 64 for maintaining the surface of the rack above the height of the volatile liquid. The wire rack can suitably be used to support non-deformable painting or surface coating applicators such as rollers, pads and the like which are advantageously placed in a vertical position on the rack. Those skilled in the art will recognize that paint brushes should not be stored in a vertical position supported by their bristles on such a rack as brush bristles are apt to become deformed when used to support the paint brush.

FIG. 5 illustrates a rack for supporting painting implements such as rollers. The rack shown in FIG. 5 includes vertical member 82 which is used to move the rack to and from the interior of the container. Vertical supports 84 are of a suitable height for maintaining rollers indicated generally by dotted lines 86, vertically upright. The rack for supporting painting rollers, shown in FIG. 5, can suitably be used with the container apparatus of FIG. 2. When the rack, shown in FIG. 5, is to be used with a container, such as shown in FIG. 1, wherein the volatile liquid is maintained in the bottom of the container, the rack will advantageously be provided with feet (not shown), which will maintain painting applicators 86 above the height of the volatile liquid. Alternatively, the rack shown in FIG. 5 can be used together with the rack shown in FIG. 4 without the necessity for providing feet on the rack of FIG. 5.

Figure 1A:
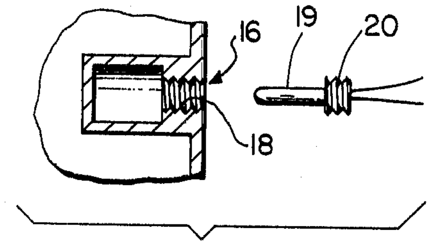
FIG. 1A is an exploded view in cross section of a portion of the apparatus shown in FIG. 1.

The volume of the container will obviously vary depending upon the size and shape of the surface coating applicators to be preserved. Typically, the container will have a volume of between about one quart and 7 gallons, advantageously between about 2 and about 5 gallons. Where the container is of a large volume, e.g., above about 3 gallons, or where the preservation is being conducted in a cool atmosphere, heating means can advantageously be included in the apparatus for increasing vaporization of the volatile liquid. Such a heating means is illustrated in FIGS. 1 and 1A. Thus, container 2 of FIG. 1 can include a recessed portion 16, shown in exploded view in FIG. 1A. Recessed portion 16 can be provided with female threads 18 for receiving a heating element 19 including male threads 20. Heating element 19 can simply be a small wattage light bulb powered by means not shown such as AC current or batteries. Alternatively, vaporization of the volatile liquid can be increased by providing pump means, not shown, for decreasing the pressure within the sealed container.

As previously indicated, various volatile organic solvents can be used as a preservation agent when the surface coating material is an oil-based or organic solvent based material. Thus, alcohols such as methanol, ethanol, isopropanol and the like; ketones such as acetone, MEK and the like; terpenes such as turpentine; aliphatic and aromatic hydrocarbons such as pentane, heptane, hexane, toluol and the like; chlorinated hydrocarbons such as methylene chloride; acetates; ethers; nitroparaffins and the like, and mixtures of these liquids can readily be used. An especially advantageous preservation agent for use with organic based coating compositions is turpentine. It has been found that turpentine slowly reacts with, and thus removes, oxygen from the container. Thus, drying and hardening of coating compositions due to reaction with oxygen can be further lessened.

Where the surface coating material is a water-based latex material, the volatile liquid preservation agent will be ammonia or a volatile amine or a solution of ammonia or a volatile amine in water. Such compounds include ammonia, methylamine, dimethylamine, and other N-lower alkyl substituted amines, morpholine and N-lower alkyl substituted morpholines and the like.

It is further advantageous to include ammonia or a volatile amine with organic solvent preservation agents for the prevention of corrosion of painting applicators. Inclusion of an amine in the organic solvent is especially appropriate when a chlorinated solvent is included, since chlorinated solvents hydrolyze with traces of water to produce HCl.

When preserving polyolefin brushes for extended periods of time using hydrocarbon preservation agents, it has been found that the polyolefin bristles exhibit a tendency to curl. In such instances a restraining means should be provided to maintain the bristles in brush form. Such retaining means can simply be strips of metal foil wrapped laterally around the bristles.

The following examples serve to illustrate the best modes contemplated for practicing the invention:

EXAMPLE 1

A three-fourth inch wide nylon brush was wetted with Sherman Williams MARVETHANE polyurethane. It was suspended vertically, bristles down, in a one gallon, closed cylinder over 50 ml. of steam-distilled wood turpentine at the bottom of the cylinder. The temperature was 25° C.

The following day the brush was removed and found to be soft and flexible with no evidence of hardening. Without any conditioning, it was used to apply more MARVETHANE and returned to the closed cylinder and suspended over the same 50 ml. of turpentine at 30° C.

Nine hours later the brush was still excellently preserved and was used to apply more of the same coating. It was returned to preservation/storage over the same 50 ml. of turpentine. The next day the brush was used twice to apply polyurethane and thereupon without cleaning was stored as previously described, when not in use.

Next, the cylinder having the uncleaned brush over the 50 ml. of turpentine was suspended directly over a lighted 25 watt bulb overnight. Examination the next day revealed the bristles were quite wet with turpentine. After wiping on a towel the brush was hung up to air dry. Four hours later the bristles had become tacky and stiff. Further storage in the mildly heated cylinder over the 50 ml. of turpentine returned the brush to excellent condition. It was used without conditioning to apply more MARVETHANE and returned uncleaned to storage at ambient temperature over the original 50 ml. solvent. The next day the temperature was 14° C., and the brush was slightly stiff; it was washed in the 50 ml. turpentine regaining its original flexibility.

EXAMPLE 2

A three-fourth inch brush was wetted with WATERLOX "½ hour to dust free" polyurethane and suspended in a one gallon, closed, vertical cylinder over 20 ml. of wood turpentine. The cylinder was stored overnight on a surface at 30° C. The room air temperature was 17° C. It was found that essentially no polyurethane had been extracted from the bristles, yet they were wet, soft and flexible.

EXAMPLE 3

A test was set up to study the effects of two volumes of turpentine and two temperature levels. Cotton cloth strips were saturated with "½ hour to dust free" polyurethane and draped over horizontal wire racks placed in one quart, closed mason jars. Four jars were set up as follows:

Jar A—30 ml. turpentine @ 24° C.
Jar B—15 ml. turpentine @ 24° C.
Jar C—30 ml. turpentine @ 19° C.
Jar D—15 ml. turpentine @ 19° C.

After 16 hours storage all cloth strips were found to be wet, soft and very flexible. Again, after three days storage, there were no signs of hardening of polyurethane on the strips. The same observation was noted after nine days. Finally, testing was continued by holding three of the test jars at room temperature for almost two months. When taken from the jars, the strips were wet, soft and flexible. They were air dried overnight. They were somewhat flexible but markedly different in texture and more stiff than strips of the same cloth which had never been exposed to polyurethane. Obviously, they still contained some polyurethane.

EXAMPLE 4

A new one inch brush was used to apply DuPont's engine and boot topping enamel No. 635 black. It was wiped lightly against a paper towel and placed without cleaning in a one gallon, closed cylinder, bristles down over 30 ml. of wood turpentine. The cylinder was kept unheated overnight at 17°–20° C. The next day a little turpentine which had collected on the bristles was wiped off against a newspaper. The bristles were soft and flexible. Storage was continued under the same conditions with examination at 7 and 27 days with good preservation against hardening. Finally, the brush was cleaned with "epoxy and lacquer" thinner, washed with soap and water and then air dried. The condition of the dry brush was excellent.

EXAMPLE 5

A cloth strip saturated with "½ hour to dust free" polyurethane was draped over a horizontal wire and suspended over 15 ml. of a commercial mixture of toluol, isopropanol and petroleum distillate in a closed, one quart mason jar. Another jar was also prepared where the saturated cloth was suspended over a commercial petroleum distillate paint thinner. The cloth strips were found to be soft and flexible after being kept in the closed jars for four days at 15°–20° C. After ten days storage the strip over toluol, isopropanol and petroleum distillate was wet, soft and flexible; the one over the petroleum distillate had hardened and was not satisfactorily preserved.

EXAMPLE 6

Fifty-seven grams of Sears Roebuck's epoxy and lacquer thinner was put in a one gallon, vertical cylindrical, closed glass container. A new one and one-half inch wide polyolefin paint brush was used to apply WATERLOX "½ hour to dust free" polyurethane and then suspended uncleaned over the thinner in the closed vessel. The temperature was 18° C.

The next day the bristles were wet, soft and flexible. The brush was used to apply more of the polyurethane and returned uncleaned suspended over the solvent in the closed cylinder. The following day upon examination the bristles were wet, soft and flexible. At this examination the bristles were beginning to curl outward in all directions. After five days of storage uncleaned in this fashion the bristles, although wet, soft and flexible, had so curled outward in all directions spoiling the shape of the brush and making it unsuitable for use. It was dried overnight and became hard and stiff.

Another polyolefin brush was wetted with the same polyurethane and suspended over the same charge of solvent. However, in this case a "bristle keeper" consisting of two flat pieces of cedar shingle were kept pressed against the bristle sides with a light spring. Examinations both one and two days later revealed the bristles wet, soft, flexible and conforming to the same shape as for a new brush. The tendency for the bristles to curl had been avoided yet the usual preservation effect remained intact. The "bristle keeper" consisting of shingle pieces and spring was replaced by another of light gage aluminum kitchen foil (double thickness, wrapped around to keep desired brush contour). After four days over the same charge of solvent the brush bristles did not show any tendency to curl or flare; moreover, they were wet, soft and flexible.

EXAMPLE 7

Thirty ml. of steam distilled wood turpentine was placed in a one gallon, closed, vertical cylinder. Two new one inch paint brushes were suspended side by side over the solvent pool. One brush was saturated with clear "½ hour to dust free" polyurethane; the other with Olympic green gold solid color linseed oil base stain. After standing two days at an ambient temperature of about 19° C. the bristles were examined and found to be soft and flexible. They were kept under the same conditions for three more days with excellent preservation. They were washed in turpentine, water with soap and hung up to dry. Two days later the dry brushes were found to be in excellent condition. Throughout this test the temperature was 15°-20° C.

EXAMPLE 8

A vertical, closed cylinder 11½ inches in diameter × 14 inches high was fitted with two horizontal wire supports five and one-half inches and 13½ inches from its base, respectively. One hundred grams of wood turpentine were placed in the cylinder. Two cloth strips saturated with "½ hour to dust free" polyurethane were draped on the horizontal wires at each level. The cylinder was closed and kept at ambient temperature of about 17° C. The strips were examined daily for three days. All were found to be satisfactorily protected against drying and hardening.

One strip from each level was washed with the remainer of the 100 grams of turpentine used in the test. All four strips were air dried. The unwashed strips were hard and stiff; the two washed with "used" turpentine were distinctly less stiff and hard.

EXAMPLE 9

The 11½ inch diameter × 14 inch high vertical cylinder used in Example 8 was fitted with a wooden rack made of four one inch wide wood strips fastened together to make a hollow rectangle. This rack was positioned horizontally two inches above the bottom of the cylinder.

One hundred seventy-three grams of wood turpentine was added to the cylinder. A commercial Tip & Dip paint dispenser and an eight inch long paint applicator pad were wetted with Olympic green gold solid color linseed oil-based stain. The implements were placed on the rack and the cylinder closed. After two days at ambient temperature of about 18° C. the paint applicator pad was soft and flexible. The film on the Tip & Dip dispenser was soft and wet.

EXAMPLE 10

A new two inch wide paint brush was wetted with water and used to apply J. C. Penney's white exterior latex water-based paint No. 941 191712. It was wiped on a paper towel and suspended over a pool of 100 grams water and 10 grams of household ammonia in a one gallon, closed, vertical cylinder at 60°-70° F. Twenty-three days later the brush still contained white paint which was very wet and soft. Clean-up with soap and water was easy leaving the brush in excellent condition.

EXAMPLE 11

The two inch brush used in Example 10 was used to apply more of the same white latex paint and then stored uncleaned over 30 ml. of undiluted household ammonia at 16°-19° C. Two days later it was easily cleaned with soap and water. The clean water wet brush was stored in the cylinder over the 30 ml. of ammonia for five days. It was then used to apply more of the same water-based paint on two successive days being kept in the uncleaned state over the aqueous ammonia when not used. There was never any evidence of deterioration of its condition.

EXAMPLE 12

One hundred and two grams of water and 30 grams of 25% aqueous methylamine were placed in a one gallon closed, vertical cylinder. A two inch wide, water wet paint brush was used to apply J. C. Penney Co.'s white exterior latex paint No. 941 291712. The uncleaned brush was suspended over the water-methylamine in the closed cylinder. The temperature was 19° C.

The next day the brush was found to be soft and flexible. It was used to apply more of the same paint and returned to storage over the aqueous amine solution. The same examination and evaluation procedure was carried out on the second day with the same results. On the third day, the brush was soft and flexible. More paint was applied with it. Then it was washed out with water and was in fine condition both as to cleanliness and contour of bristles.

EXAMPLE 13

One hundred and sixty-six grams of water and 30 ml. of N-methylmorpholine were placed in a one gallon, vertical cylinder. A water-wet, two inch wide brush used to apply J. C. Penney's white exterior latex paint was suspended over the aqueous pool and the cylinder closed. The temperature was 17° C.

The next day the brush was taken from the cylinder and used "as is" to apply more of the same paint. It was then returned uncleaned to the cylinder. The following day it was removed, readily cleaned with water and was in excellent condition. It was then put back over the aqueous N-methylmorpholine for storage.

EXAMPLE 14

A two inch nylon brush was used to apply PARKS pure orange shellac to seal knots prior to painting. The material was labelled "3 lb. ready to use." The uncleaned brush was suspended over approximately 100 ml. of methanol in a one gallon, closed, vertical cylinder. The temperature was 18°-20° C. At one and two days' storage, the brush was examined. The bristles were found to be wet, soft and flexible. The bristle keeper was applied to the brush which was then returned to storage under the same conditions. It appeared that such storage can be continued for many days—probably indefinitely.

EXAMPLE 15

During a period of five days, a three inch nylon brush was used for several hours daily to apply either Sears Roebuck's mold resistant oil-based house paint primer No. 24905 or OLYMPIC outside white linseed oil solid color.

After the first days's use, the uncleaned brush was stored over 200 ml. of turpentine in a five gallon, vertical, closed cylinder (18°–20° C.). The second day it was found to be in excellent condition and was used to apply more paint. Then it was partially cleaned with petroleum-based solvent and again stored over the 200 ml. of turpentine. The next morning the bristles were soft but were deformed and did not become easily manageable until after about two hours of painting. Thereafter, at the end of each day, the brush was only wiped lightly with a paper towel and hung over the same 200 ml. of turpentine. Each morning the brush was in excellent condition, and the brush condition was much better than in the instance where partial cleaning with the petroleum solvent was practiced. There were no deformed bristles and there was no "startup period" where residual cleaning solvent was diluting out the paint as it was being accumulated on the bristles.

Although the invention has been described in considerable detail with reference to specific preferred embodiments, variations and modifications can be made without departing from the scope of the invention as described in the foregoing specification and defined in the appended claims.

What is claimed is:

1. The method of preserving a coating applicator comprising providing a sealable container including a volatile, liquid preservation agent in the interior thereof;

said container further including an interior space in gaseous communication with said liquid preservation agent;

supporting in said interior space a coating applicator having a substantial quantity of dryable liquid surface coating composition on the application surface, said coating applicator being supported out of liquid contact with said liquid preservation agent;

reversibly sealing said container;

and maintaining said applicator in said interior space and in said condition of having said dryable liquid coating composition on the application surface until further use of the coating applicator.

2. The method of claim 1, wherein said volatile, liquid preservation agent comprises ammonia or a volatile amine and wherein said surface coating composition is a water-based latex material.

3. The method of claim 2, wherein said preservation agent is an aqueous solution of a compound selected from the group consisting of ammonia, N-lower alkyl substituted amines, morpholine and N-lower alkyl substituted morpholine.

4. The method of claim 1, wherein said volatile, liquid preservation agent is an organic solvent, and said dryable liquid surface coating composition is an organic solvent-based composition.

5. The method of claim 4, wherein said volatile, liquid preservation agent further includes a volatile amine.

6. The method of claim 4, wherein said volatile, liquid preservation agent is turpentine.

7. The method of claim 4, wherein said volatile, liquid preservation agent is heated while said applicator is maintained in said interior space.

8. The method of claim 4, wherein the dryable surface coating composition consists essentially of paint.

9. The method of claim 2, wherein said volatile organic solvent is selected from the group consisting of alcohols, ketones, terpenes, aliphatic hydrocarbons, aromatic hydrocarbons, chlorinated hydrocarbons, acetates, ethers, nitroparaffins and mixtures of said solvents.

10. The method of claim 4, wherein said surface coating applicator is a brush comprising bristles and wherein a restraining means is applied around the brush bristles to prevent deformation of the bristles during preservation.

11. The method of claim 4, wherein said volatile, liquid preservation agent is provided at the bottom of said sealable container and wherein said coating applicator is supported vertically within said sealable container.

12. The method of claim 11, wherein said surface coating applicator is a paint brush.

* * * * *